Jan. 15, 1929.  1,699,440
A. NAGEL
VALVE GEAR FOR LIQUID METERS ON VEHICLES OR THE LIKE
Filed Dec. 5, 1925    2 Sheets-Sheet 1

A. Nagel
inventor

By: Marks and Clark
Attys

Jan. 15, 1929.  A. NAGEL  1,699,440

VALVE GEAR FOR LIQUID METERS ON VEHICLES OR THE LIKE

Filed Dec. 5, 1925   2 Sheets-Sheet 2

Inventor
August Nagel
By Marks & Clerk
Attys.

Patented Jan. 15, 1929.

1,699,440

UNITED STATES PATENT OFFICE.

AUGUST NAGEL, OF STUTTGART, GERMANY.

VALVE GEAR FOR LIQUID METERS ON VEHICLES OR THE LIKE.

Application filed December 5, 1925, Serial No. 73,533, and in Germany January 10, 1925.

This invention relates to a valve gear for a liquid-meter with measuring vessel and float, more particularly for measuring the fuel-consumption in automobile vehicles.

In this connection the connecting of the valve rod gear not directly with the tilting lever controlled by the float but with the interposition of a snap acting mechanism between them is known.

One constructional form of the invention is illustrated by way of example in the accompaning drawings.

Figure 1:
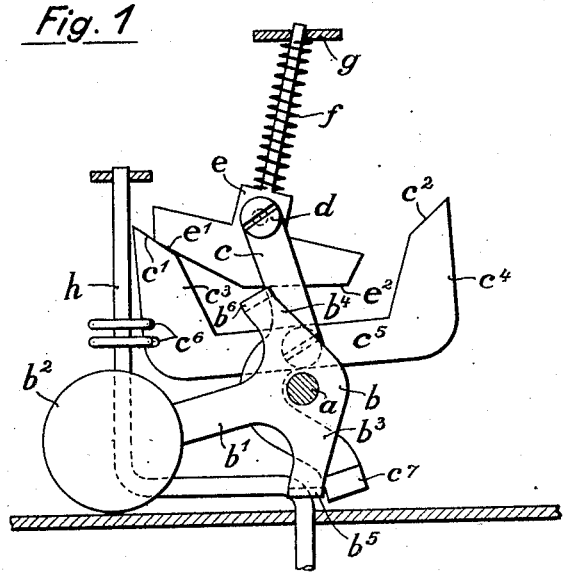
Figure 2:
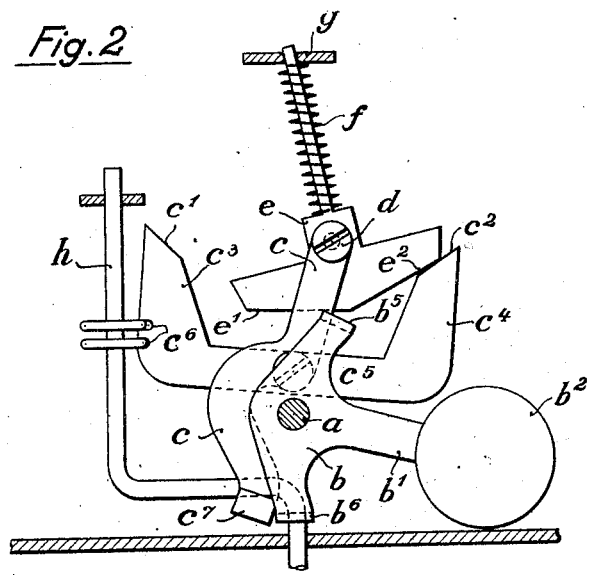
Figure 3:
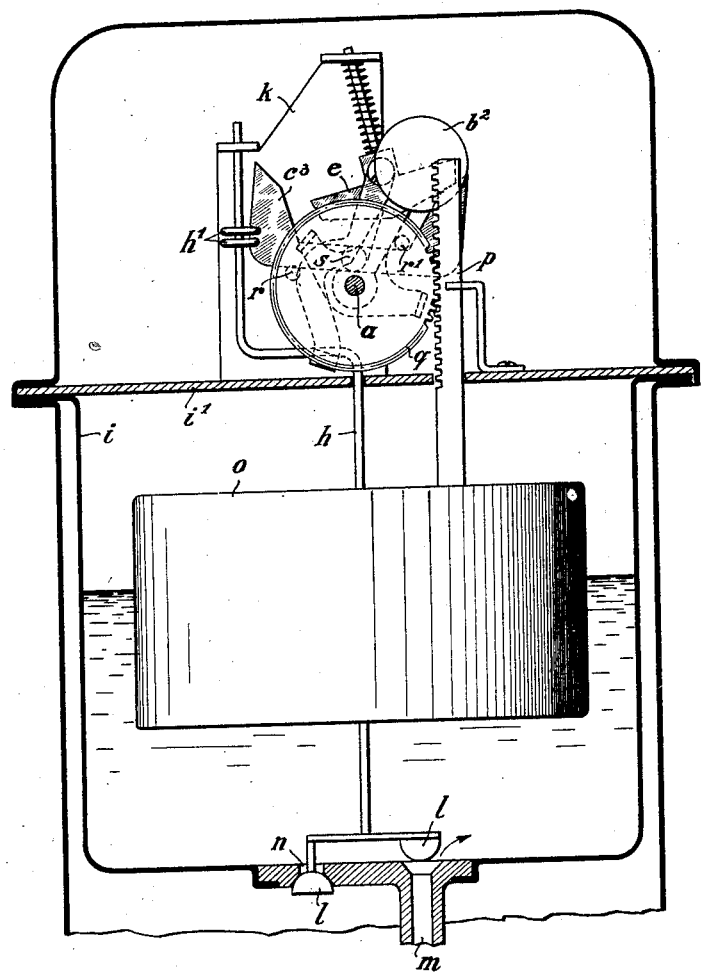

Figures 1 and 2 show the valve-control mechanism in two opposite locked positions. Figure 3 is a general view of the measuring apparatus, and Figure 4 a side view thereof, partly in section.

Figure 4:
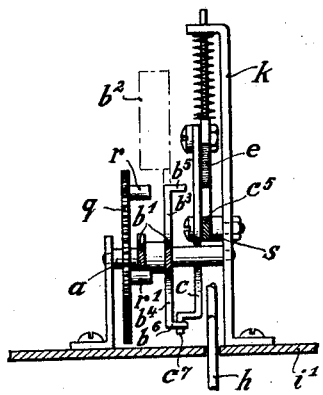

In the measuring tank $i$ of a fuel meter for automobile vehicles there is a rod $h$. The latter is slidably supported in a supporting member $k$ and in the closure plate $i^1$ of the measuring tank. The rod $h$ carries valves $l$ at its lower end. These valves co-operate with a liquid inlet $m$ and a liquid outlet $n$ of the measuring tank $i$. Over the rod $h$ there slides a float $o$. The latter carries a rack $p$, which meshes with a toothed wheel $q$, which is rigidly connected with a shaft $a$. On this toothed wheel are located pins $r$ and $r^1$, which serve as drivers for a weight lever $b$. This weight is freely rockable about the shaft $a$. It has a central arm $b^1$, which carries a tipping weight $b^2$. Two members $b^3$ and $b^4$ projecting towards opposite sides of the aforementioned central arm $b^1$ carry stops $b^5$ and $b^6$ respectively. In Figure 4 is shown, extending in the same direction as the arm $b^1$, a second arm, which is located within the range of rotation of the driver pins $r$ and $r^1$. The arm $b^1$ that carries the tilting weight might alternatively have been bent forwards, so as to come within the range of rotation of these driver pins. According as the tipping weight tilts to one side or the other, one or the other of the stops $b^5$ and $b^6$ comes into contact with a projection $c^7$, on the lower arm of a lever $c$. The latter rocks about a pivot $s$. Its upper arm is connected by a pivoted joint $d$ with an anchor-shaped member $e$, having a rod-like attachment which extends in an upward direction and is guided by a bearing or support $g$ on the supporting frame $k$. A spring $f$ coiled round this rod is compressed during the rocking movement of the anchor $e$ and relaxed as soon as the tilting weight $b^2$ has passed beyond its dead centre. Lateral arms on the anchor $e$ have bevelled surfaces $e^1$, $e^2$, which slide alternately over bevels $c^1$, $c^2$ respectively, located on limbs $c^3$, $c^4$ of a member $c^5$ somewhat resembling a scale beam, whereby these two members are anchored or locked to one another. The scale-beam-like member $c^5$ also swings about the shaft $s$. The member $c^5$ has recesses or notches $c^6$. In these there engage attachments $h^1$ on the valve rod $h$, so that during the rocking of the member $c^5$ the valve rod $h$ is raised or lowered, as a result of which the alternating action of the valves occurs.

The method of working of the apparatus is as follows:—

The liquid passes through the inlet passage $m$ into the measuring tank $i$ (see Figure 3). The float $o$ is raised. The rack $p$ thereupon sets in rotation the toothed wheel $q$, which rotates the shaft $a$. The pin $r^1$ bears against the arm $b^1$ of the tilting weight lever $b$, which is freely rotatable about the shaft $a$. The weight $b^2$ at the end of the arm $b^1$ is carried along with it as far as the dead centre. Hereupon it plunges downwards and strikes with the attachment $b^5$ against the projection $c^7$ on the lever $c$ rotating about the shaft $s$. The lever $c$ takes with it, by means of its pivotal connection $d$, the anchor $e$, which is rockable upon the latter. The spring $f$ is compressed between the upper part of the anchor and the bearing surface $g$. Immediately afterwards there occurs the relaxation of the spring, and the bevel $e^1$ of the anchor $e$ pushes itself over the bevel $c^1$ of the scale-beam-like member $c^5$, which is rockable freely about the shaft $s$, into the locked position of the members $c$, $e$ (see Figure 1). During this rocking movement of the parts, by engagement of the projections or bridge pieces $h^1$ on the rod $h$ in the recesses $c^6$ in the part $c^5$, the rod $h$ has been displaced downwards and the valve bodies $l$ have closed the inlet passage $m$ and opened the outlet passage $n$.

The liquid now flows out of the measuring tank $i$ into a connected storage reservoir, and during this discharge, by the descent of the float, the members previously described are influenced in the opposite direction.

What I claim is:

1. Valve reversing mechanism for a liquid meter with measuring vessel and float, comprising a valve rod, a tilting weight, float actuated means adapted to control said tilting weight, a bent lever, means enabling the tilting weight, at the end of its tilting movement in either direction, to rock said bent lever, a T-shaped member pivotally connected with one end of said bent lever so as to be displaced when said bent lever rocks, and a U-shaped scale beam adapted to be rocked by the displacement of the T-shaped member.

2. Valve reversing mechanism as claimed in claim 1, the U-shaped scale beam being formed with notches, and the mechanism further comprising bridge pieces on the valve rod engaging in said notches.

3. Valve reversing gear as claimed in claim 1, the T-shaped member being formed with two oblique surfaces, the U-shaped scale beam also being formed with two oblique surfaces, and the oblique surfaces of the T-shaped member being adapted to co-operate with the oblique surfaces of the U-shaped scale beam to secure the valve rod gear in position after reversal.

4. Valve reversing mechanism for a liquid meter with measuring vessel and float, comprising a valve rod, a tilting weight lever, float actuated means adapted to cause said tilting weight lever to tilt in one direction as the float rises and in the opposite direction as it sinks, the tilting weight lever being adapted to complete its movement in either direction suddenly by the dropping of the weight as soon as the float actuated means have carried it past its dead centre position, a U-shaped rocking lever, means enabling said U-shaped rocking lever to raise and lower the valve rod when rocked, and a two-armed lever adapted to be rocked in either direction by the tilting weight lever as the movement of said tilting weight lever is completed by the dropping of the weight, and to impart corresponding rocking movements to the U-shaped rocking lever.

5. Valve reversing mechanism for a liquid meter with measuring vessel and float, comprising a valve rod, a tilting weight lever, float actuated means adapted to cause said tilting weight lever to tilt in one direction as the float rises and in the opposite direction as it sinks, the tilting weight lever being adapted to complete its movement in either direction suddenly by the dropping of the weight as soon as the float actuated means have carried it past its dead centre position, a two-armed lever adapted to be rocked in either direction by the tilting weight lever as the movement of said tilting weight lever is completed by the dropping of the weight, an anchor-shaped member pivoted to the free end of said two armed lever and adapted to be oscillated thereby, a U-shaped rocking lever adapted to be rocked by said anchor-shaped member, and means enabling said U-shaped rocking lever to raise and lower the valve rod when rocked.

6. Valve reversing mechanism for a liquid meter with measuring vessel and float, comprising a valve rod, a tilting weight lever, float actuated means adapted to cause said tilting weight lever to tilt in one direction as the float rises and in the opposite direction as it sinks, the tilting weight lever being adapted to complete its movement in either direction suddenly by the dropping of the weight as soon as the float actuated means have carried it past its dead centre position, a two armed lever adapted to be rocked in either direction by the tilting weight lever as the movement of said tilting weight lever is completed by the dropping of the weight, an anchor-shaped member pivoted to the free end of said two armed lever and adapted to be oscillated thereby, a notched U-shaped rocking lever adapted to be rocked by said anchor-shaped member, and projections on the valve rod adapted to engage with the notches in said U-shaped rocking lever to enable said U-shaped rocking lever to raise and lower the valve rod when rocked.

7. Valve reversing mechanism for a liquid meter with measuring vessel and float, comprising a valve rod, a tilting weight lever, float actuated means adapted to cause said tilting weight lever to tilt in one direction as the float rises and in the opposite direction as it sinks, the tilting weight lever being adapted to complete its movement in either direction suddenly by the dropping of the weight as soon as the float actuated means have carried it past its dead centre position, a two armed lever adapted to be rocked in either direction by the tilting weight lever as the movement of said tilting weight lever is completed by the dropping of the weight, an anchor-shaped member pivoted to the free end of said two armed lever and adapted to be oscillated thereby, said anchor-shaped member being formed with two oblique surfaces, a U-shaped rocking lever adapted to be rocked by said anchor-shaped member, said U-shaped rocking lever being formed with two oblique surfaces adapted to co-operate with the oblique surfaces of the anchor-shaped member to secure the valve rod in position after reversal, and means enabling said U-shaped rocking lever to raise and lower the valve rod when rocked.

In testimony whereof I have signed my name to this specification.

AUGUST NAGEL.